US006433104B1

(12) United States Patent
Macedo et al.

(10) Patent No.: US 6,433,104 B1
(45) Date of Patent: Aug. 13, 2002

(54) HYDROGENATION PROCESS

(75) Inventors: Anne Vera Macedo, Bruxelles (BE); Jerry Lee Haluska, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/592,954

(22) Filed: Jun. 13, 2000

(51) Int. Cl.[7] .................................................. C08F 8/04
(52) U.S. Cl. ................. 525/338; 525/327.9; 525/333.7; 525/339
(58) Field of Search ................. 525/338, 339

(56) References Cited

U.S. PATENT DOCUMENTS

| 2,062,845 | A | 12/1936 | Thomas et al. |
| 2,963,467 | A | 4/1960 | Small ........................ 260/82 |
| 3,442,877 | A | 5/1969 | Moritz et al. |
| 3,701,760 | A | 10/1972 | Hagemeyer, Jr. et al. |
| 4,629,766 | A | 12/1986 | Malatesta et al. |
| 5,227,568 | A | 7/1993 | Biddau et al. |
| 5,491,214 | A | 2/1996 | Daughenbaugh et al. |
| 5,552,363 | A | 9/1996 | Pannell et al. |
| 5,820,749 | A | 10/1998 | Haluska et al. |

FOREIGN PATENT DOCUMENTS

| DE | 14 20 350 | 4/1969 |
| EP | 0 082 726 | 6/1983 |
| EP | 0 046 634 B | 10/1985 |
| EP | 0 368 419 | 5/1990 |
| FR | 1 521 018 | 4/1968 |
| JP | 04 108809 | 4/1992 |

*Primary Examiner*—Bernard Lipman
(74) *Attorney, Agent, or Firm*—Paige Schmidt; Mandi B. Milbank; Charles E. Runyan, Jr.

(57) ABSTRACT

This invention relates to an improved resin hydrotreating process which maintains resin softening point and aromaticity as well as catalyst lifetime. The process is particularly useful for hydrotreating resins containing one or more halogen residues. Pressures are maintained at 2000 psi or less. Color is substantially reduced while softening point is not decreased by more than 8° C.

18 Claims, No Drawings

HYDROGENATION PROCESS

FIELD

This invention relates to an improved resin hydrotreating process which maintains resin softening point and aromaticity as well as catalyst lifetime. The process is particularly useful for hydrotreating resins containing halogen residue.

BACKGROUND

Petroleum resin hydrogenation processes are well known. Hydrocarbon resins obtained from thermal or catalytic polymerization of olefin and diolefin containing streams are often dark in color which is undesirable for many applications. Hydrogenation processes are used to lighten the color and improve heat and ultraviolet light stabilities. Hydrogenation processes, however, have their own limitations. For example, catalytically polymerized resins may contain halogen residue derived from the catalyst. These catalyst residues tend to accumulate on the acidic surface of the hydrogenation catalyst. This accumulation in combination with hydrogenation conditions tends to hydrocrack the resin and deteriorate key resin properties such as resin softening point and reduces product yield. We have discovered a unique hydrogenation process that reduces resin color while maintaining softening point and catalyst life.

U.S. Pat. No. 4,629,766 describes a hydrogenation process intended for thermally polymerized resins that uses high hydrogen pressure to improve yields, color and heat stability.

U.S. Pat. No. 5,491,214 describes a batch hydrogenation process that uses specific catalysts designed to hydrogenate only color bodies in the resin without hydrogenating the resin's carbon-carbon double bonds.

U.S. Pat. No. 5,552,363 describes a specific hydrogenation catalyst that is resistant to halogen contaminants in the resin. U.S. Pat. No. 5,820,749 also describes a specific hydrogenation catalyst designed primarily to increase productivity.

SUMMARY

The processes described herein generally enable hydrotreatment of resins on a continuous basis without prior treatment of the resins to remove catalyst residues. Process conditions are provided for different types of resin to limit cracking of the resin backbone while improving the resin color. In particular the processes of this invention are directed to a one-step hydrogenation process comprising:

(a) introducing hydrocarbon resin having from about 50 ppm by weight to about 2000 ppm by weight of one or more halogen residues into a reactor, said resin having a softening point X, where X is a temperature of from about 70° C. to about 150° C.;

(b) hydrotreating the resin in the reactor with a catalyst using pressure of not more than 2000 psi for a time period of at least 800 hours at a temperature in the range of from about 100° C. to about 350° C. thereby producing at least 350 tons of polymer per ton of catalyst; and (c) recovering from the reactor hydrotreated resin having a softening point Y° C. of no less than X–8.

DESCRIPTION

This invention is directed to processes for hydrotreating hydrocarbon resin or rosin under suitable hydrotreating conditions, with a mono or bi-metallic catalyst system based on Group 6,7,8,9,10 and 11 elements (IUPAC notation Handbook of Chemistry and Physics, 70th Ed., 1989/1990) supported on an acidic support such as alumina. Hydrocarbon resins prepared from catalytic or thermally polymerized petroleum feed streams and hydrogenated according to the invention exhibit lighter color compared to the original and with aromaticity, softening point properties equivalent to the original resin.

The catalytically polymerized resins obtained from the polymerization of $C_5$–$C_{10}$ with Friedel-Crafts or Lewis Acids catalysts and hence contain catalyst halogen residues. The processes described herein enable hydrotreatment of the resins on a continuous basis without prior treatment of the resins to remove catalyst residues. Process conditions are provided for different types of resin to limit cracking of the resin backbone while improving the resin color. Cracking deteriorates important physical properties such as resin softening point, molecular weights, decreases product yield and reduces effective catalyst life.

Although this hydrogenation process may be conducted batch-wise, it is uniquely suited to a one-step or one-stage, continuous, fixed-bed hydrogenation process. "One-step" or "one-stage" means that the entire hydrogenation is conducted in one reactor without further hydrogenation in a separate vessel and without any prior step to remove impurities such as halogen residues from the resin. Preferably the process is continuous and is conducted at a rate of at least 350 tons of polymer produced per ton of catalyst used for at least 800 hours, more preferably at least 1000 hours, even more preferably at least 1500 hours and most preferably at least 3000 hours.

In the most preferred process, hydrogenation is conducted using petroleum resins obtained from the cationic polymerization of steam-cracked naphtha using a Friedel-Crafts catalyst such as aluminum trichloride or boron trifluoride. Resins can also be obtained from thermal polymerization using cyclo-aliphatic or cyclo-aliphatic and aromatic feeds. The preferred resins are those known to be useful as tackifiers for adhesive applications and road-marking applications and polymer modification. Petroleum resins include hydrocarbon resins that have been modified with aromatic or terpene containing feedstream; hydrocarbon resins from pure aromatic monomers, the coumarone-indene resins and the polyterpenes resins. For additional description of feedstream derivation, monomer composition, methods of polymerization and hydrogenation, reference can be made to technical literature, e.g. *Hydrocarbon Resins,* Kirk-Othmer, *Encyclopedia of Chemical Technology,* 4th Ed. v.13, pp. 717–743. The natural resins, rosins including gum rosins, wood rosin, and tall oil rosins can also be hydrotreated according to this process.

The hydrogenation process of this invention is particularly useful for hydrotreating halogen containing resins. Resins produced by Friedel-Crafts polymerization typically contain between about 50 ppm by weight and about 2000 ppm halogen residue, some contain between about 1000 ppm by weight and about 1500 ppm by weight halogen residue. As used herein, "halogen residue" means any compound containing one or more halogen atoms.

Petroleum resins are typically produced by thermally or catalytically polymerizing petroleum fractions. These polymerizations may be batch, semi-batch or continuous. Petroleum fractions containing aliphatic $C_5$ to $C_6$ linear, branched, alicyclic monoolefins, diolefins, alicyclic $C_{10}$ diolefins can be polymerized. The aliphatic olefins can comprise one or more natural or synthetic terpenes, preferably one or more of alpha-pinene, beta-pinene, delta-3-carene, dipentene, limonene or isoprene dimers. $C_8$–$C_{10}$ aromatic olefinic streams containing styrene, vinyl toluenes, indene, methyl-indenes can also be polymerized as such or in mixture with the aliphatic streams.

Thermal polymerization is usually carried out at a temperature between 160° C. and 320° C., e.g., at about 250° C., for a period of 0.5 to 9 hours, typically 1.5 to 4 hours. Catalytic polymerization is usually carried out with a Friedel-Crafts or Lewis Acid catalyst such as metallic halides such as aluminum trichloride or boron trifluoride, aluminum tribromide or mixture thereof, as well as ternary complexes of the halides, aromatic compounds and hydrogen halides. A polymerization reaction is usually run at a temperature between −20° C. to 200° C., preferably between 0° C. and 120° C. and more preferably between 20° C. and 80° C. Catalytic polymerization is usually accomplished in a polymerization solvent and removal of solvent and catalyst by washing and distillation. The hydrotreating process of this invention is essentially useful for treating catalytically polymerized aliphatic or aromatic resins containing catalyst-derived halogen residue.

The polymeric resin so produced is dissolved in an inert, de-aromatized or non-de-aromatized hydrocarbon solvent such as Exxsol™ or Varsol™ or base white spirit in proportions varying from 10% to 60% and preferably in the region of 30% by weight polymer. Hydrogenation is then conducted in a fixed-bed, continuous reactor with the feed flow being either an upflow or downflow liquid phase or trickle bed operation.

Hydrogenation treating conditions generally include reactions ranging in temperature of from about 100° C. to about 350° C., preferably ranging from about 150° C. to about 300° C., more preferably ranging from about 160° C. to about 270° C. The hydrogen pressure within the reactor should not exceed more than 2000 psi, preferably no more than 1500 psi, and most preferably no more than 1000 psi. The hydrogenation pressure is, however, a function of the hydrogen purity and the overall reaction pressure should be higher if the hydrogen contains impurities to give the desired hydrogen pressure. Typically the optimal pressure used is between about 750 psi and 1500 psi, preferably between about 800 psi and about 1000 psi. The hydrogen to feed volume ratio to the reactor under standard conditions (25° C., 1 atm Pressure) typically can range from about 20 to about 200.

Catalyst activity typically decreases over time due to carbonaceous deposition onto the catalyst support, this can be partially eliminated or removed by regenerating the catalyst bed with pressure hydrogen at temperatures between about 310° C. and 350° C. Pressures from 60 to 180 bar can be used. This regeneration is best accomplished in the absence of hydrocarbon feed to the reactor, e.g., during interruption of the hydrogenation process. The reactor is typically fed with an inert solvent such as Exxsol® or Varsol® during the regeneration process.

Catalysts employed for the hydrogenation of resins are typically supported monometallic and bimetallic catalysts systems based on Group 6,7,8,9,10 and 11 elements (IUPAC notation Handbook of Chemistry and Physics, 70th Ed., 1989/1990). Catalysts based on cobalt, nickel, tungsten, palladium, copper and/or zinc are particularly suitable. The catalyst preferably used in this process is hydrodesulphurization catalyst prepared by impregnating the oxides of nickel and tungsten onto an alumina support, preferably a high surface area alumina such as gamma alumina. The preferred components are nickel and tungsten on a gamma alumina support. The concentration of metals on the catalyst is important for good performance and ranges from 2 to 10, preferably 4 to 5, weight percent nickel and from 10 to 25, preferably 16 to 20 weight percent tungsten. The pore size distribution of the alumina support is also important to the performance of the catalyst. The catalyst is prepared such that the pore volume of the small pores in the 15–300 Angstrom radius range is less than 70% of the total pore volume whereas the large pores or channels having radii in the range of 10,000 to 75,000 A are at least 10% of the total pore volume between 10 and 75,000 Angstrom. This results in a fresh catalyst surface area of the support typically in the range of 120–300 $m^2/g$.

Other suitable catalysts are detailed in U.S. Pat. No. 5,820,749 (fully incorporated herein by reference). Particularly suitable catalysts described in this patent include those comprising the metals nickel and/or cobalt and one or both of molybdenum or tungsten on a support comprising porous refractory substrate particles having: a) a mean maximum diffusion path length less than or equal to twice the hydraulic radius of the particle; b) a pore volume distribution wherein, i) pores having diameters >150,000 ($1.5 \times 10^{-5}$ m) Å constitute greater than about 2% of the total volume, ii) pores having diameters >20,000 Å and less than 150,000 Å constitute greater than about 1% of the total volume, and iii) pores having diameters >2,000 Å ($2.0 \times 10^{-7}$ m) and <20,000 Å ($2.0 \times 10^{-6}$ m) constitute greater than about 12% of the total volume; and c) a total pore volume of from about 45% to 86% of the total volume of the substrate particles.

The catalyst can be prepared by impregnating the support material with water-soluble compounds of nickel and/or cobalt and either molybdenum or tungsten as described in U.S. Pat. No. 5,820,749. Suitable catalyst supports are high surface area alumina such as η-alumina and γ-alumina.

After impregnation, the support containing the nickel and/or cobalt and tungsten or molybdenum compounds is dried to remove the water from the impregnation solution. The dried support containing the nickel and/or cobalt and tungsten or molybdenum compounds is heat treated to decompose the nickel and/or cobalt and tungsten or molybdenum compounds to their oxide. Suitable temperatures range from about 300° C. to about 550° C. The amount of nickel oxide and/or cobalt oxide on the support ranges from 2% to 10% by weight. The amount of tungsten or molybdenum oxide on the support after preparation ranges from 5% to 25% by weight. Preferably the catalyst contains 4% to 7% by weight nickel oxide and 18% to 22% by weight tungsten oxide.

Typical activators for these catalysts include sulfiding agents in the presence of hydrogen. The sulfur compounds that can be used include $H_2S$ carbon disulfide, methyldisulfide, ethyldisulfide, propyldisulfide, isoporpyldisulfide, butyldisulfide, tertiary butyldisulfide, thianaphthene, thiophene, secondary dibutylsulfide, tertiary butylsulfide, dithiols and sulfur-bearing gas oils. Any other organic sulfur source that can be converted to $H_2S$ over the catalyst in the presence of hydrogen can be used. These catalysts can also be activated by an organo sulfur process as described in U.S. Pat. No. 5,530,917.

In addition a basic promoter may be used with the metal compounds, particularly if improved halogen resistance is sought. Promoters include metals form Groups 1–3, including the lanthanide and actinide series, of the periodic table of elements. The preferred promoters are typical lanthanum and potassium. The basic promoters may be used in amounts of 0.25% to 10% by weight of the total catalyst, preferably 1% to 3% by weight.

The hydrogenation process of this invention results in commercially acceptable resin decolorization while avoiding or significantly limiting cracking of the resin backbone due to acidic support surface and hydrochloric acid formation caused by resin dehalogenation. Because most of the halogen, typically chlorine, passes through the reactor rather than accumulating on the catalyst bed, not only is cracking reduced, but catalyst life is greatly extended.

After hydrogenation, the mixture from the reactor may be flashed and further separated to recover the solvent and hydrogen for recycle and to recover the hydrogenated resin. The resin solution is flashed and/or distilled in an oxygen free or minimum oxygen atmosphere to eliminate the solvent, and thereafter may be steam distilled to eliminate oligomers, preferably with care not to raise the temperature of the resin above 250° C. to avoid degrading the color and other properties of the resin.

Resins thus obtained have a color of 5YI to 40YI depending on the initial color and on the resin structure. Using the process of this invention, the color is typically reduced by 30% to 80%, preferably by at least 40%, more preferably by at least 50%.

The softening point of the hydrocarbon resin produced using this hydrogenation process should not change by more than 8° C., preferably not more than 5° C., even more preferably not more than 3° C. and most preferably there should be no detectable change in softening point of the resin before and after hydrogenation using the process of this invention.

In the process of this invention, the resins are hydrogenated such that at least 1.0% by weight of the carbon-carbon double bonds are reduced. In one embodiment at least 2.0% by weight of the carbon-carbon double bonds are reduced, and in another at least 2.5%, or even at least 3.0% by weight of the carbon-carbon double bonds are reduced.

The aromatic resins are hydrogenated such that the aromaticity level should not change by more than 5% by weight of equivalent styrene, preferably not more than 2%, even more preferably there should be no detectable change in aromaticity level of the aromatic resin before and after hydrogenation using the process of this invention.

Resin Aromaticity and carbon-carbon double bonds levels may be determined by $^1$H-NMR. Aromaticity is the integration of aromatic protons versus an internal standard (1,2 dichloroethane) given as weight percent of equivalent styrene, (104 g/mol). Carbon-carbon double bonds is the integration of olefinic protons versus an internal standard (1,2 dichloroethane) given as weight percent of equivalent —CH=CH—, (26 g/mol).

The resins obtained from this process preferably include hydrocarbon resins suitable as tackifiers for adhesive compositions, particularly adhesive compositions comprising polymeric base systems of either natural or synthetic elastomers including natural rubber, styrene block copolymers, ethylene-vinyl ester copolymers, metallocene polymers. Such compositions find particular utility in hot melt adhesive, pressure-sensitive adhesive and adhesive emulsions. Resins obtained from this process can also be used in road-marking compositions, as ink resins, as components in varnishes, paints and polymer modifiers.

The following examples are presented to illustrate the foregoing discussion. Although the examples may be directed to certain embodiments of the present invention, they are not to be viewed as limiting the invention in any specific respect.

EXAMPLES

Resin Characterization

Resin color was determined using a Hunter Ultrascan type of Colorimeter. The sample to be analyzed was prepared by weighing 10 grams (±0.02 g) of resin into a 20 ml. scintillation vial. An equal weight of toluene was added to the vial. The vial was then shaken until all of the resin was dissolved. The solution was then poured into a quartz cuvette and then analyzed for Yellowness Index (YI) color using the Colorimeter.

Color stability of the resin is the color of the resin after aging in a ventilated oven. A sample of 10 g (±0.1 g) of resin was heated at 175° C. (±0.5° C.) for 5 hours. The sample was further allowed to cool down to Room Temperature and the color of the aged resin was measured in the same way as the Initial Color.

Resin Softening Point was determined according to the Ring & Ball method based on ASTM E-28, (Revision 1996).

Resin melt viscosity was determined according to a method based on ASTM D-3236-88. The resin melt viscosity is the apparent viscosity of the resin measured in millipascalseconds (mPa·s) with Spindle 21 and at 150° C. or 160° C. as specified in the Examples.

Resin molecular weights were measured by Low-Temperature Size Exclusion Chromatography against Polystyrene standards. A differential refractometer (DRI) and a UV-detector are used. The separation is done at a temperature of 40° C. using tetrahydrofuran as solvent. Molecular weight averages are reported as polystyrene equivalent molecular weights.

Resin Aromaticity and carbon-carbon double bonds levels were determined by $^1$H-NMR. Aromaticity is the integration of aromatic protons versus an internal standard (1,2 dichloroethane) given as weight percent of equivalent styrene, (104 g/mol). Carbon-carbon double bonds is the integration of olefinic protons versus an internal standard (1,2 dichloroethane) given as weight percent-of equivalent —CH=CH—, (26 g/mol).

Catalyst Sulfidation Procedure

The catalyst was flushed for over 10 hours with as Exxsol® D40. After flushing, the catalyst was activated by treating with dimethyldisulfide (DMDS) in accordance with known procedures.

Hydrogenation Following Activation

The resin feeds used in the Examples were solutions of commercially available catalytically polymerized hydrocarbon resin obtained by polymerizing feedstream containing $C_4$–$C_6$ olefins and conjugated diolefins, $C_8$–$C_{10}$ aromatic olefins with aluminum chloride at a temperature between 20° C. and 100° C., preferably from 40° C. to 80° C. The finished resin was further diluted in Exxsol® D40 (Available from ExxonMobil Chemical Company). This solution of resin served as the feedstock. This feed was passed through the hydrotreating reactor at a Temperature between 160° C. and 250° C. at a liquid feed /gas volume ratio of 100 and at a space velocity of 1.0 to 1.5 volumes of feed per volume of catalyst per hour (VVH). The hydrogen flow rate was 27 Nl/hr and the hydrogen pressure was 870 psi. Product samples were collected from the reactor, the polymerizate was processed to hard resin and analyzed for neat resin properties such as Initial Color, Color Stability, Softening Point, Molecular Weight Distribution, Aromaticity level and carbon-carbon double bonds level. The run length in hours and the ratio: weight of resin produced per weight of catalyst used (T/T) are recorded to compare the performance of the hydrotreating process versus the decoloring performance of the resin and the retention of the resin softening point. In the following examples data are provided for different types of resins.

The Run length (in hours) and the ratio: Tons of resin produced per Tons of catalyst used are recorded to compare the performance of the hydrotreating process versus the decoloring performance of the resin and the retention of the resin softening point. In the following examples data are provided for different types of resins.

Example 1

The feedstock was a freshly made-up solution of a commercially available aliphatic resin: Escorez® 1102 RM (available from ExxonMobil Chemical Company) diluted to 30 wt % resin in Exxsol® D40 (available from ExxonMobil Chemical Company). The feedstock was hydrotreated on a freshly activated catalyst charge of a commercially available catalyst (UCI T-2557 E). Inlet Temperature in the reactor was from 210° C. to 230° C. The catalyst performance and the resin properties before and after hydrotreating are reported in Table-1. This example shows that the catalyst has been used for 1768 hours. After 1457 hours the catalyst has been regenerated through a catalyst hydrotreat. The resin obtained has a softening point of 100° C. versus 101° C. before hydrotreating and a color of 32 YI versus 49 YI before hydrotreating. A second feedstock made of a fresh solution of a commercially available aromatic modified resin: Escorez® 2101 (available from ExxonMobil Chemical Company) diluted to 30 wt % resin in Exxsol® D40 was hydrotreated on the same catalyst charge and the Inlet Temperature of the reactor was varied between 220 and 240° C. The catalyst was used for another 901 hours. A second catalyst hydrotreat was performed after 2397 hours. The resin obtained had a softening point of 88° C. versus 93° C. before hydrotreating and a color of 23 YI versus 79 YI. The level of aromaticity of that resin decreased by 0.5 wt % equivalent styrene. The total length of this run was 2669 hours or 1040 Tons of resins per Ton of catalyst.

Example 2

The second feedstock of Example 1 was hydrotreated on a freshly activated catalyst charge of a commercially available catalyst (UCI T-2601 E). The Inlet Temperature of that test was 200° C. to 210° C., lower than in the preceding Example. After 354 hours utilization, a resin with 93° C. softening point and an Initial Color of 17 YI was obtained, (Table-2). The aromaticity level of the resin was not changed. This Example shows that the lower severity of the run compared to the preceding one has resulted in a product with improved Initial Color without change of Softening Point. In a second part of the test, another commercially available aromatic modified resin: ECR-373 (available from ExxonMobil Chemical Company) was hydrogenated with the same catalyst charge. The Inlet Temperature of that test was 210–225° C. A resin with 20 YI Initial Color (versus 80 YI before hydrogenation) and 91° C. Softening Point (versus 89° C. before hydrogenation) was obtained. The difference of 2° C. higher for the hydrogenated product versus the precursor results from the stripping of the resin solution into hard resin.

Example 3

Similarly to the previous examples, four feedstocks made from different resins were consecutively hydrotreated on the same catalyst charge of a commercially available catalyst (UCI T-2601 E). These feedstocks were respectively freshly made-up solutions of commercially available aromatic modified aliphatic resin: Escorez® 2184, ECR-413, ECR-184 and an aliphatic resin ECR-415 (available from ExxonMobil Chemical) diluted to 30 wt % resin in Exxsol® D40 (available from ExxonMobil Chemical). Conditions of the run and resins properties are reported in Table 3. One catalyst regeneration has been carried out before switching to ECR-184 feedstock. The total length of this run was 951 hours or 476 Tons of resin per Ton of catalyst. Efficient resin decoloration is achieved without cracking as indicated by resin softening point and molecular weights.

Example 4

Same as Example 3, four feedstocks have been consecutively hydrotreated on a new catalyst charge (UCI T-2601 E). These feedstocks were respectively freshly made-up solutions of commercially available aliphatic resins: ECR-415, Escorez® 1102 RM, an aromatic modified resin: Escorez® 2203 and an aliphatic resin Escorez® 1310 (available from ExxonMobil Chemical) diluted to 30 wt % resin in Exxsol® D40 (available from ExxonMobil Chemical). Process conditions and resin properties are reported in the Table-4. The last feedstock of Example 3: ECR-415 was hydrotreated with an inlet Temperature of 180° C., lower than in the preceding example. The less severe condition allows to obtain a resin with a higher Softening Point, 100° C., versus 101° C. for the precursor with a significant color improvement: 22 YI versus 90 YI for the precursor. One catalyst regeneration has been carried out before switching to Escorez® 2203 feedstock.

TABLE-1

| Resin Type |  | Escorez 1102 RM | Escorez 2101 |
|---|---|---|---|
| Inlet Temperature | ° C. | 210–230 | 220–240 |
| Outlet Temperature | ° C. | 220–250 | 235–260 |
| Run Length | hours | 1768 | 901 |
| Resin / Cat ratio | T/T | 689 | 351 |
| Soft Point of the resin | ° C. | 101 | 93 |
| Soft. Point after H2 | ° C. | 100 | 88 |
| Initial Color | Yl | 49 | 79 |
| Initial Color after H2 | Yl | 32 | 23 |
| Heat Stability | Yl | 121 | 148 |
| Heat Stabillty after H2 | Yl | 53 | 81 |
| Melt Viscosity | mPa.s | 1970(°) | 1335(#) |
| Melt Viscosity after H2 | mPa.s | 1870(*) | 676(#) |
| Aromaticity (eq. styrene) | wt % | — | 29 |

TABLE-1-continued

| Resin Type | | Escorez 1102 RM | Escorez 2101 |
|---|---|---|---|
| Aromaticity after H2 | wt % | — | 28.5 |
| residual —CH2=CH2— | wt % | 5.0 | 3.2 |
| residual —CH2=CH2— after H2 | wt % | 3.0 | 0.7 |
| Mn | g/mol | 1340 | 830 |
| Mn after H2 | g/mol | 1400 | 800 |
| Mw | g/mol | 3630 | 1680 |
| Mw after H2 | g/mol | 3570 | 1500 |

(*) at 160° C.
(#) at 150° C.

TABLE-2

| Resin Type | | Escorez 2101 | ECR-373 |
|---|---|---|---|
| Inlet Temperature | ° C. | 200–210 | 210–225 |
| Outlet Temperature | ° C. | 215–225 | 225–240 |
| Run Length | hours | 354 | 482 |
| Resin / Cat ratio | T/T | 167 | 228 |
| Soft Point of the resin | ° C. | 93 | 89 |
| Soft. Point after H2 | ° C. | 93 | 91 |
| Initial Color | Yl | 79 | 80 |
| Initial Color after H2 | Yl | 17 | 20 |
| Heat Stability | Yl | 148 | 157 |
| Heat Stability after H2 | Yl | 112 | 105 |
| Melt Viscosity at 150° C. | mPa.s | 1335 | |
| Melt Viscosity affer H2 | mPa.s | 1175 | 938 |
| Aromaticity (eq. styrene) | wt % | 29 | 25 |
| Aromaticity after H2 | wt % | 29 | 25 |
| residual —CH2=CH2— | wt % | 3.2 | 3.9 |
| residual —CH2=CH2— after H2 | wt % | 0.9 | 1.4 |
| Mn | g/mol | 830 | 770 |
| Mn after H2 | g/mol | 840 | 780 |
| Mw | g/mol | 1680 | 1510 |
| Mw after H2 | g/mol | 1600 | 1420 |

TABLE-3

| Resin Type | | Escorez 2184 | ECR-413 | ECR-184 | ECR-415 |
|---|---|---|---|---|---|
| Inlet Temperature | ° C. | 210 | 210–220 | 169–185 | 190–200 |
| Outlet Temperature | ° C. | 226 | 225–235 | 170–206 | 197–218 |
| Run Length | hours | 284 | 374 | 139 | 154 |
| Resin / Cat ratio | T/T | 139 | 190 | 70 | 77 |
| Soft. Point of the resin | ° C. | 96 | 96 | 94 | 101 |
| Soff. Point after H2 | ° C. | 97 | 95 | 97 | 95 |
| Initial Color | Yl | 81 | 81 | 16 | 90 |
| Initial Color after H2 | Yl | 11 | 38 | 9 | 10 |
| Heat Stability | Yl | 148 | — | — | 149 |
| Heat Stability after H2 | Yl | 61 | 103 | — | — |
| Melt Viscosity 150° C. | mpa.s | 1800 | — | — | 3100 |
| Melt Viscosity after H2 | mpa.s | 1225 | — | — | — |
| Aromaticity (eq styrene) | wt % | 31 | 9 | 5.7 | — |
| Aromaticity after H2 | wt % | 31 | 9 | 5.7 | — |
| residual —CH2=CH2— | wt % | 2.7 | 3.6 | 6.1 | — |
| residual —CH2=CH2— after H2 | wt % | 0.5 | 3.1 | 4.6 | — |
| Mn | g/mol | 810 | 1180 | 1180 | 1100 |
| Mn after H2 | g/mol | 800 | 1070 | 1180 | 1070 |
| Mw | g/mol | 1810 | 2590 | 1890 | 2090 |
| Mw after H2 | g/mol | 1560 | 2290 | 1850 | 1910 |

TABLE-4

| Resin Type | | ECR-415 | Escorez 1102 RM | Escorez 2203 | Escorez 1310 |
|---|---|---|---|---|---|
| Inlet Temperature | ° C. | 180 | 196 | 170 | 170–180 |
| Outlet Temperature | ° C. | 187 | 203 | 176 | 173–184 |
| Run Length | hours | 168 | 282 | 310 | 234 |
| Resin / Cat ratio | T/T | 83 | 141 | 154 | 116 |
| Soft. Point of the resin | ° C. | 101 | 99 | 96 | 95 |
| Soff. Point after H2 | ° C. | 100 | 102 | 96 | 96 |

TABLE-4-continued

| Resin Type | | ECR-415 | Escorez 1102 RM | Escorez 2203 | Escorez 1310 |
| --- | --- | --- | --- | --- | --- |
| Initial Color | YI | 90 | 42 | 24 | 32 |
| Initial Color after H2 | YI | 22 | 19 | 6 | 10 |
| Heat Stability | YI | 149 | 97 | 83 | |
| Heat Stability after H2 | YI | 93 | 85 | — | 73 |
| Melt viscosity at 150° C. | mPa.s | 3100 | — | 1775 | |
| Melt viscosity after H2 | mpa.s | — | — | 1887 | |
| Aromaticity (eq. styrene) | wt % | — | — | 8 | |
| Aromaticity after H2 | wt % | — | — | 7 | |
| residual —CH2═CH2— | wt % | 5.6 | 5.3 | 6.2 | 4.5 |
| residual —CH2═CH2— after H2 | wt % | 3.3 | 3.7 | 3.9 | 4.2 |
| Mn | g/mol | 1100 | 1330 | 1160 | 1180 |
| Mn after H2 | g/mol | 1090 | 1350 | 1150 | 1210 |
| Mw | g/mol | 2090 | 3870 | 2020 | 1810 |
| Mw after H2 | g/mol | 2010 | 3750 | 1960 | 1860 |

The above Examples show that by the appropriate selection of hydrotreating conditions, such as Inlet Temperature, Hydrogen Pressure, it has been possible to obtain efficient hydrocarbon resin decoloration without significant cracking. This is indicated by the small variation of resin softening point and resin molecular weights.

What is claimed is:

1. A one-stage hydrogenation process comprising:
   (a) introducing into a reactor hydrocarbon resin having from about 50 ppm by weight to about 2000 ppm by weight one or more halogen residues, said resin having a softening point X, where X is a temperature in the range of from about 70° C. to about 150° C.;
   (b) hydrotreating the resin in the reactor with a catalyst using pressure of not more than 2000 psi at a temperature in the range of from about 100° C. to about 350° C. thereby producing at least 350 tons of polymer per ton of catalyst, wherein said catalyst is used for at least 800 hours; and
   (c) recovering from the reactor hydrotreated resin having a softening point of no less than X−8° C.

2. The hydrogenation process of claim 1 wherein the halogen residue is not removed from the resin prior to step (a).

3. The hydrogenation process of claim 1 wherein the resin of step (a) has carbon-carbon double bonds that are hydrogenated in step (b) such that at least 1% by weight of the carbon-carbon double bonds are reduced.

4. The hydrogenation process of claim 1 wherein step (b) is conducted using pressure of no more than 1500 psi (10,342.5 kPa).

5. The hydrogenation process of claim 1 wherein step (b) is conducted using pressure of no more than 1000 psi (6,895 kPa).

6. The hydrogenation process of claim 1 wherein step (b) is conducted using temperature that ranges from about 150° C. to about 300° C.

7. The hydrogenation process of claim 1 wherein step (b) is conducted using temperature that ranges from about 160° C. to about 270° C.

8. The hydrogenation process of claim 1 conducted for a time period of at least 1000 hours.

9. The hydrogenation process of claim 1 conducted for a time period of at least 1500 hours.

10. The hydrogenation process of claim 1 wherein the catalyst used in step (b) is supported on an acidic support.

11. The hydrogenation process of claim 1 wherein the hydrotreated resin recovered in step (c) has a softening point of not less than X° C−5.

12. The hydrogenation process of claim 1 wherein the hydrotreated resin recovered in step (c) has a softening point of not less than X° C.

13. The hydrogenation process of claim 1 wherein the hydrotreated resin recovered in step (c) has an aromaticity level that is not decreased by more than 5% equivalent styrene during step (b).

14. The hydrogenation process of claim 1 wherein the hydrotreated resin recovered in step (c) has an aromaticity level that is not decreased by more than 2% equivalent styrene during step (b).

15. The hydrogenation process of claim 1 wherein the color (Yellowness Index) is reduced by at least 40%.

16. The hydrogenation process of claim 1 wherein the hydrocarbon resin is catalytically polymerized.

17. The hydrogenation process of claim 1 wherein the hydrocarbon resin of step (a) contains from 100 ppm by weight to 1500 ppm by weight of one or more halogens.

18. A continuous, one-stage hydrogenation process comprising:
   (a) introducing hydrocarbon resin having from about 50 ppm by weight to about 2000 ppm by weight of one or more halogen residues into a reactor, said resin having a softening point X, where X is a temperature of from about 70° C. to about 150° C.;
   (b) hydrotreating the resin in the reactor with a catalyst using pressure of not more than 1500 psi at a temperature in the range of from about 160° C. to about 270° C. thereby producing at least 350 tons of polymer per ton of catalyst, wherein said catalyst is used for at least 1000 hours; and
   (c) recovering from the reactor hydrotreated resin having a softening point of no less than X−5° C.

* * * * *